United States Patent [19]
Dill et al.

[11] 3,880,524
[45] Apr. 29, 1975

[54] AUTOMATIC ELLIPSOMETER

[75] Inventors: Frederick H. Dill, Putnam Valley; Peter S. Hauge, Yorktown Heights, both of N.Y.

[73] Assignee: International Business Machines Corporation, Armonk, N.Y.

[22] Filed: June 25, 1973

[21] Appl. No.: 373,540

[52] U.S. Cl. .............. 356/118; 356/152; 356/161; 250/225
[51] Int. Cl. ........................................ G01n 21/40
[58] Field of Search .......... 356/118, 114, 161, 152; 250/225

[56] References Cited
UNITED STATES PATENTS

| | | | |
|---|---|---|---|
| 3,185,024 | 5/1965 | McCreanor | 356/161 X |
| 3,703,682 | 11/1972 | Wickman et al. | 356/152 X |
| 3,737,235 | 6/1973 | Hawes | 356/114 |

OTHER PUBLICATIONS

Cahan, "A High Speed Precision Automatic Ellipsometer," Surface Science, Vol. 16, (1969) pp. 166–176.

*Primary Examiner*—Ronald L. Wibert
*Assistant Examiner*—Paul K. Goodwin
*Attorney, Agent, or Firm*—Isidore Match; John J. Goodwin

[57] ABSTRACT

An automatic ellipsometer is disclosed which comprises a mechanical-optical, an electrical, and a digital (computer) component. The mechanical-optical component includes a light source, various polarizing elements (one of which spins continuously), necessary apertures, and a light detector. The electrical component includes a signal from the light detector, trigger pulses from an angular shaft encoder, and an analog-digital converter, and produces a string of digitized data in a form which can be read and analyzed by digital logical circuitry. The digital (computer) component comprises logic circuitry in sufficient quantity to store and execute a relatively simple data analysis program, there being suitably associated with the digital component, one or more print-out and/or display devices. To facilitate automation of ellipsometric operation, there is provided a sample alignment system which includes a spot-defining aperture in the incident light beam, a sample holder with capability for rotation about two perpendicular axes intersecting at the intersection of the axis of the light beam source and the axis of the detector, and a four-quadrant beam deviation detector located a convenient distance from the sample along the detector axis. In the operation of the system, the sample is properly oriented about two axes of rotation, and data in the form of light intensity transmitted through a continuously spinning analyzer in the reflected beam path is sampled at convenient angular intervals to provide data which is digitally coded, and the data then is numerically Fourier analyzed to enable extrapolated properties of the sample to be displayed or typed out. The entire sequence of operations, i.e., from sample insertion to type out or display is on the order of about 5–10 seconds.

20 Claims, 11 Drawing Figures

AUTOMATIC ELLIPSOMETER

BACKGROUND OF THE INVENTION

This invention relates to ellipsometry. More particularly, it relates to a novel automatic ellipsometer which enables a substantial decrease in the time required for making ellipsometric measurements as compared to the time required by known ellipsometers. Thereby, there is made possible the novel ellipsometer's use as an in-line process controller in a manufacturing environment and the ellipsometer's utility as a research tool is greatly enhanced.

Ellipsometric techniques are based upon the fact that a linearly polarized light vibration may be resolved into two perpendicular vibrations that are in phase. One of these vibrations is in the incidence plane and the other is normal to the incidence plane. After reflection or transmission, these vibrations undergo amplitude and phase changes which are generally different. Thus, the light is then elliptically polarized. The ellipsometer enables the measurement of the changes in the state of polarization. Generally, an ellipsometer essentially comprises a collimated and monochromatic light source, a polarizer with or without a quarter-wave plate, surface, an analyzer and a photodetector. In simple nulling systems, the detector is employed to determine the positions of the polarizing optics for which the light is a minimum.

Ellipsometric techniques are sensitive and useful mechanisms for the study of bare and film-covered surfaces. However, when employed manually, such techniques are undesirably slow. In this connection, the necessary manual balancing of the polarizer and analyzer employing the method of "swings" (the finding of a null by measuring a particular but arbitrary angle $\theta$ on each side of the null for which the transmitted light intensities are equal) may require, under steady state conditions, as much as 5 minutes manipulation by a skilled operator and much longer manipulation periods in a dynamically changing system.

It is, therefore, apparent that an imperative need exists, particularly for use in dynamically changing situations for a fast, automatic ellipsometer. Attempts in this direction have proposed ellipsometers which are capable of measuring the azimuth angle $\alpha$ and the ellipticity $e$ of elliptically polarized light in a very short period. However, such automatically operating ellipsometers have only partially solved the problems which are presented. For example, they do not provide any information as to the properties of samples which are being utilized to study and analyze, such properties for example being film thickness, refractive index, etc.

Accordingly, it is an important object of this invention to provide a completely automatic ellipsometer which is characterized by desirably rapid operation and which can be advantageously employed for analysis of sample characteristics.

It is another object to provide a completely automatic ellipsometer which is capable of being utilized as an in-line process controller for monitor in a manufacturing environment such as, for example, the manufacture of integrated circuits, and which has enhanced utility as a research tool.

It is a further object to provide a device for effecting automatic sample alignment in an ellipsometric process.

Prior Art

In the publication of B. D. Cahan titled "A High Speed Precision Automatic Ellipsometer," Surface Science 16 (1969), pp. 166–176, and published by the North-Holland Publishing Co., Amsterdam, there is disclosed an automatically operating ellipsometer which is capable of measuring the azimuth and ellipticity of elliptically polarized light. However, in this ellipsometer there is no capability for automatic sample alignment whereby time expenditure cannot be minimized. In addition, with this ellipsometer, there is not obtained information as to the properties of a sample being analyzed such as film thickness and refractive index.

In the publication of W. Budde, titled "Photoelectric Analysis of Polarized Light," Applied Optics, Vol. 1, pp. 201–205, (1962), there is disclosed as a polarimetric technique, the sampling of intensity at equal angular increments of analyzer position and subsequent Fourier analysis. In this publication, it is pointed out that the noise reduction and least squares fit advantages of the technique. However, according to this disclosure:

a. The procedure is accomplished manually - 1 revolution of data in 10 minutes.
b. The Fourier analysis is performed at a subsequent time.
c. The technique measures only the polarization of light per se, i.e., a polarimetric technique as contrasted with the properties of materials interacting with the light, i.e., an ellipsometric technique.
d. Makes no use of (does not point out the significance of) other harmonics.

Summary of the Invention

In accordance with the invention, there is provided an automatic ellipsometer which comprises means for disposing a sample whose characteristics are to be measured by the ellipsometer in a chosen incidence plane. A monochromatic light source is included for providing an incident light beam on said sample to cause the light beam to be reflected from the sample, a first polarizing element being disposed in the path of the incident light beam, the latter element being fixed at a predetermined angle relative to the incidence plane. A rotatable second polarizing element is disposed in the path of the reflected light beam, the reflected light beam passing through the second polarizing element being applied to a photo-sensitive device which produces an electrical output which is in accordance with the intensity of the light beam impinging thereon. An angular encoder is provided associated with the second polarizing element for providing respective first single trigger pulses for each revolution of the second polarizing element and respective second pulses with predetermined quantities of degrees in each of the revolutions. An analog-to-digital converter is included which is responsive to the outputs of the angular encoder and the photo-sensitive device for digitizing the output of the photo-sensitive device and digital computing means is included which is responsive to the application thereto of the output analog-to-digital converter and the first pulses from the angular encoder for analyzing the output of the photo-sensitive device.

Also, in accordance with the invention, there is provided a sample alignment system which includes a spot-defining aperture in the path of the incident light beam, a sample holder with a capability for rotation about two perpendicular axes which intersect at the intersection of the axis of the light source and the photo-sensitive device, and a 4-quadrant beam deviation detector located at a convenient distance from the sample in the path of the reflected beam.

The foregoing and other objects, features and advantages of the invention will be apparent from the following more particular description of a preferred embodiment of the invention, as illustrated in the accompanying drawings.

DESCRIPTION OF A PREFERRED EMBODIMENT

The novel, automatic ellipsometer disclosed herein is a combination of three sets of co-acting components. The first of these sets of components is a mechanical and optical one and includes a light source, various polarizing elements (one of which spins continuously), necessary apertures, the sample to be measured with necessary support and a light detector. The second set of these sets of components is electrical and includes the signal from the light detector, trigger pulses from an angular shaft encoder, and an analog-digital converter. The elements of this second set of components produce a string of digitized data in a form which can be read and analyzed by digital logic circuitry. The third set of these sets of components comprises logic circuitry in sufficient quantity to store and execute a relatively simple data analysis program, there being suitably associated with this third set of components, one or more print-out and/or display devices.

In the operation of the automated ellipsometer, constructed according to the invention, a sample to be measured is placed on a sample holder such that its top, i.e., reflecting surface, is at the proper height. To take into consideration the situation where sample thickness may vary by more than a few thousands of an inch from sample to sample, there is performed either a height adjustment or a correction in the angle of incidence resulting from a height variation. Thereafter, the following steps are performed automatically, i.e., without operator adjustment or intervention of any kind.

1. The sample is properly oriented about two axes of rotation to account for the possibility of the sample being wedge-shaped, or its top surface not being totally flat.
2. Data in the form of light intensity transmitted through a continuously spinning analyzer in the reflected beam path, sampled at convenient angular intervals such as 1°, for example, for a complete revolution starting at a known angle, are acquired and digitally coded. Alternatively, data for several revolutions may be taken and subsequently averaged.
3. The data obtained by step 2 are numerically Fourier analyzed. The sine and cosine coefficients of the second harmonic, referred to the average value over one revolution, are related by standard ellipsometric formulae to the desired properties of the sample, viz. film thickness, refractive index, etc.
4. The desired sample properties (and/or other related and calculable parameters) are displayed or typed out.
5. The sample is then removed by the operator. The entire sequence of operations, i.e., from sample insertion to print out, is carried out automatically utilizing a small general purpose digital computer such as, for example, the IBM 1,130, manufactured by the IBM Corporation. The sequence of operations takes on the order of 5–10 seconds.

Figure 1:
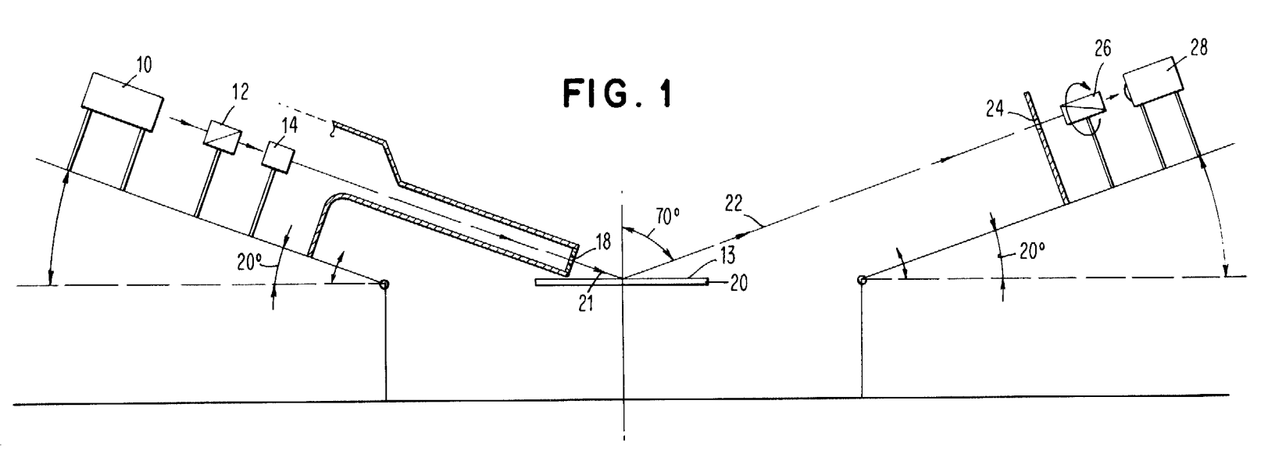
FIG. 1 is a schematic depiction of the mechanical portion of a preferred embodiment of the automatic ellipsometer constructed according to the invention.

Reference is now made to FIG. 1 wherein there is schematically depicted the mechanical and optical set of components of the ellipsometer. This set comprises a collimated, monochromatic light source 10 which may suitably be a 1 mw HeNe laser. Light from source 10 passes through a polarizing prism 12 which is fixed at a known angle (usually about 45°) relative to the plane of incidence 13, a quarter-wave plate 14 (which is optional and need not be included) and which is also fixed at a known angle, and a spot defining aperture 18. The light is then reflected from a reflecting sample 20 to be measured at a known angle relative to its normal (70°), sample 20 being disposed at a proper height by means not shown. The reflected beam is passed through a beam defining aperture 24 and a continuously driven (e.g., at 5 rotations/sec.) spinning polarizing prism (analyzer) 26 and the light from analyzer 26 is detected by a linear light-sensitive device 28, such as a photomultiplier tube. It is to be noted that the light beam 21 impinges on the reflecting surface of sample 20 at a chosen angle (20°, for example) and light beam 22 is reflected from the reflecting surface of sample 20 at a correspondingly chosen angle (such as 70°).

Figure 2:
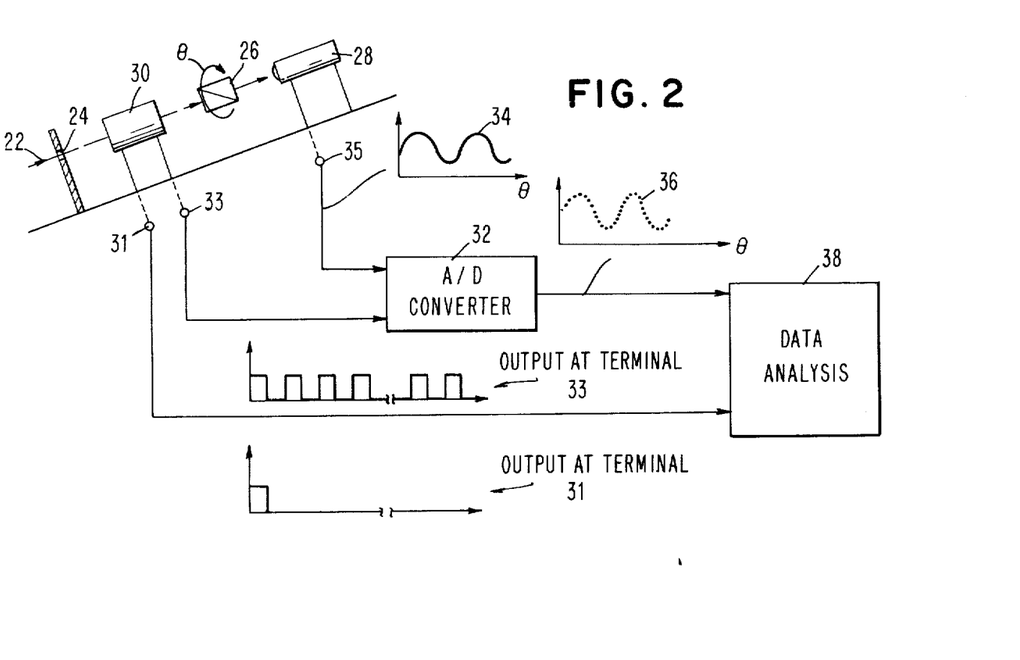
FIG. 2 is a schematic drawing of the electrical portion of the ellipsometer.

Reference is now made to FIG. 2 wherein the electrical set of components portion of the ellipsometer is schematically depicted. This electrical portion forms an interface between the optical and the digital data analysis portions. It is noted in FIG. 2 that there is shown that portion of the mechanical and optical components of FIG. 1 which includes reflected beam 22, the beam defining the aperture 24, the spinning analyzer 26, and the photodetector, i.e., the photomultiplier 28. In addition, there is shown associated with spinning analyzer 26 an angular encoder 30 having two output terminals 31 and 33. In actual construction, angular encoder 30 is mounted on the shaft, which is suitably hollow, of spinning analyzer 26. Encoder output terminal 31 suitably provides a single trigger pulse for each revolution of analyzer 26. Encoder output terminal 33 is suitably chosen to provide a pulse for equal small fractions of the 360° of a revolution. For example, where an analysis technique such as a Fast Fourier Transform is employed, the total amount of pulses per revolution advantageously supplied at encoder output terminal 33 is a power of 2 such as $2^7$, i.e., 128, $2^8$, i.e., 256, $2^9$, i.e., 512, $2^{10}$, i.e., 1,024, etc. Alternatively, at encoder output terminal 33, there can be supplied a pulse for each degree of revolution, or a pulse for each predetermined number of degrees of each revolution of analyzer 26. With this arrangement, there is enabled the tracking of analyzer 26 in small fractions of revolution steps from a given starting angle. The pulses appearing at terminal 33 are applied as triggers to an analog-to-digital converter 32.

The output terminal 35 of photomultiplier 28 is connected as the analog input to A/D 32, the output of photomultiplier 28 generally taking the form of the waveform designated by the numeral 34. Analog to digital converter 32 converts the analog input provided from the output of photomultiplier 28 to a discrete digital output which generally takes the form depicted by the dotted waveform designated by the numeral 36. With this arrangement, the light intensity in the reflected beam 22 along the transmitting angle of the analyzer is thus present in digital form at the output terminals A/D 32. The digital output of A/D converter 32 is applied to a data analyzer stage 38 which may suitably be a small computer such as the IBM 1,130 manufactured by the IBM Corporation, or by any other small digital computer. In data analyzer 38, the data is numerically Fourier analyzed with particular attention being paid to the second harmonic coefficients (referred to the average value over a complete revolution) since these describe the polarization state (orientation and ellipticity) of the reflected light. It is to be noted that only these coefficients are needed in the ellipsometric analysis of the reflected light and not the full Fourier transform. Such Fourier analysis has the effect of greatly reducing measurement "noise", i.e., random fluctuations in the individual data values. Such reduction of measurement "noise" is effected because:

1. Every data point is used. The alternative would be to estimate the angles and values of maxima and minima in the data and to find their numerical ratio. 2. The Fourier analysis essentially performs a "least squares" fit of all of the data to the ellipse describing the reflected light. 3. Another advantage of the Fourier analysis is the detection of system anomalies. Ideally, only a "dc" and second harmonic component are present in the data. However, examining other harmonic components during system alignment and initial setup facilitates the removal of such anomalies as:

a. Beam misalignment (indicated by a non-zero first harmonic).

b. Detector non-linearity (indicated by a non-zero fourth harmonic). In addition, there can also be measured the random noise from the magnitude of the remaining harmonics.

Once the normalized second harmonic coefficients have been ascertained, standard ellipsometric formulae are evaluated to find whatever calculable parameters characterizing the optical properties of the sample are desired. These are typed out on a printout such as a typewriter or visually displayed in some other manner, such as by means of a storage cathode ray tube, Nixie tubes, and the like.

Figure 3:
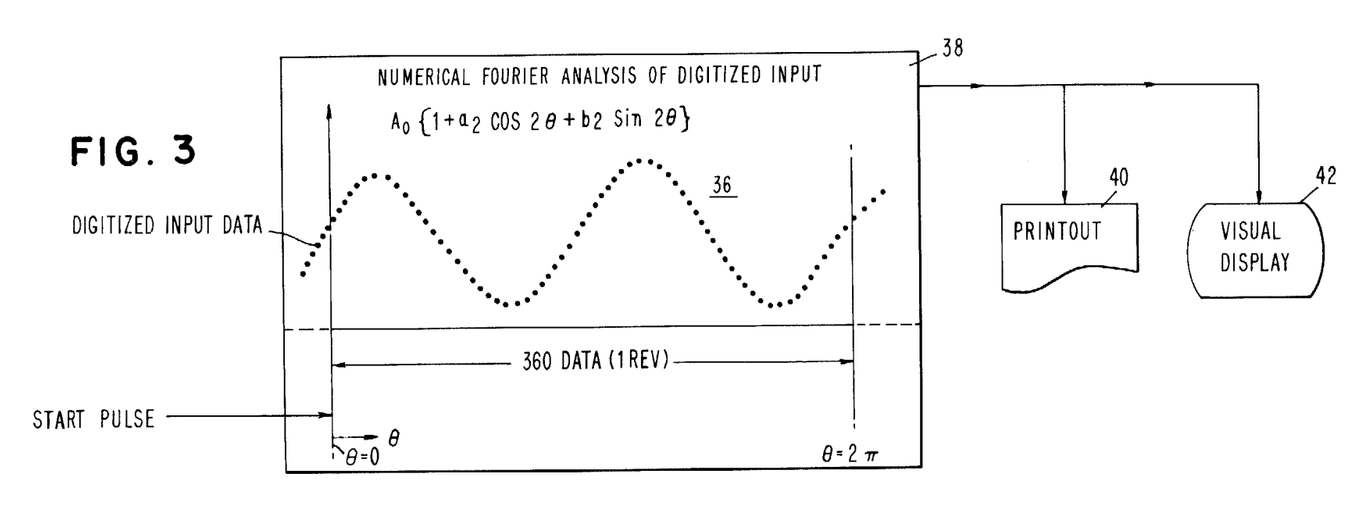
FIG. 3 illustrates the data and analysis display function of the ellipsometer.

In FIG. 3, data analyzer stage 38 is depicted as performing the numerical Fourier analysis of the digitized input, i.e., waveform 36. In this data analyzer stage, there are determined numerically the normalized coefficients of the Fourier series $a_2$, $b_2$. The standard ellipsometric formulae are evaluated to obtain desired specimen parameters such as film thickness and refractive index. Also, in FIG. 3, there are shown stage 40 legended printout, and 42 legended visual display, the printout suitably being the above-mentioned typewriter. The information which is printed out or displayed is azimuth, ellipticity, $\psi$, $\Delta$, film thickness, refractive index, etc.

The automatic ellipsometer described hereinabove are constructed according to the invention is comparable in accuracy to a known conventional manual ellipsometer, is at least as reproducible (1 or 2 Angstrom repeatability in thickness of 200–1300 A $SiO_2$ films on silicon, for example), and provides vastly enhanced speed of operation (5–10 seconds per measurement as compared to 5–10 minutes per measurement).

To effect the Fourier analysis in data analyzer stage 38, i.e., the computer, there may be suitably employed the programs designated "System/7 Fast Fourier Transform Program RPQ P82000," described in "IBM INSTALLATION NEWSLETTER," issue No. 72-11, dated June 2, 1972 and published by the IBM Corporation.

In the aforementioned Fourier analysis, the variation of the normalized Fourier coefficients $a_2$ and $b_2$ with film thickness, refractive index (or other measured parameter) determines the sensitivity of the ellipsometer to that parameter, and hence the precision of the measurement. In general, the sensitivity is greatest when the coefficients are nearly zero, i.e., when there is little variation in the intensity of the light transmitted by the rotating analyzer, or in other words, when the light reflected from the sample is nearly circularly polarized. Conversely, the sensitivity is poorest for large values (near unity) of the coefficients, i.e., when the reflected light is nearly linearly polarized. The state of polarization of the reflected light may be arbitrarily varied for any sample to be measured merely by adjusting the angular positions (azimuths) of the polarizer and compensator, i.e., the quarter wave plate, (if used) in the incident light path. A particular set of these azimuths thus defines a mode of operation of the ellipsometer, and in practice one of perhaps two or three different modes of operation will be selected to optimize measurement sensitivity for a given type of sample to be measured. For example, two such measurement "modes" that are of particular use for measuring thin films of $SiO_2$ and $Si_3N_4$ on silicon are described below. (In each case, needless to say, the effect of the state of polarization of the incident light must be taken into account when analyzing the measured values of the coefficients to determine film thickness, etc.)

The simplest input configuration is with the compensator absent and the polarizer set at 45° with respect to the plane of incidence. This is the "normal mode" of operation of the ellipsometer, and gives good sensitivity for all but very thin (less than about 250 Å) films of $SiO_2$ and $Si_3N_4$ on silicon. When the films are too thin, the reflected light approaches linear polarization and the sensitivity becomes poorer. For a relatively broad range of thickness (about 250 – 1,350 Å) where ellipsometry is preferred over other optical measurement techniques, the sensitivity in the normal mode is sufficient.

The incident optics may be adjusted for optimum measurement sensitivity to measure very thin (from 0 to about 350 Å) films. To accomplish this, for example, the polarizer azimuth is set at 12° with respect to the plane of incidence, and the compensator is inserted in the light path, following the polarizer, with its "fast axis" set at 90° with respect to the plane of incidence. This configuration defines the "thin-film mode" of operation of the ellipsometer. The effect of this set of azimuth values is to make light reflected from bare silicon to be nearly circularly polarized, with the polarization gradually changing to a linear state as the thickness of a film on the silicon increases.

In one embodiment, polarizer and compensator mounts were made which allowed for continuous adjustment of azimuth, and provided certain pinned positions (0°, 12° and 45° for the polarizer, 90° for the compensator) for reproducibly obtaining these two modes of operation without having to provide finely-divided angular readout for this adjustment.

In another embodiment, conventional polarizer and compensator mounts having finely divided azimuth readout were provided. This allowed one to continuously vary the incident polarization to find the most sensitive point of measurement for the particular sample that was being measured. This is more applicable to a research environment, where operator skill may be assumed, and the care required and time consumed in making such adjustments are not points of major objection. In the former embodiment, the use of pinned azimuth positions reduces the requirements of time, care and operator skill, and is more adaptable to a manufacturing environment, where great numbers of nominally identical films are to be measured in succession.

Figure 9:
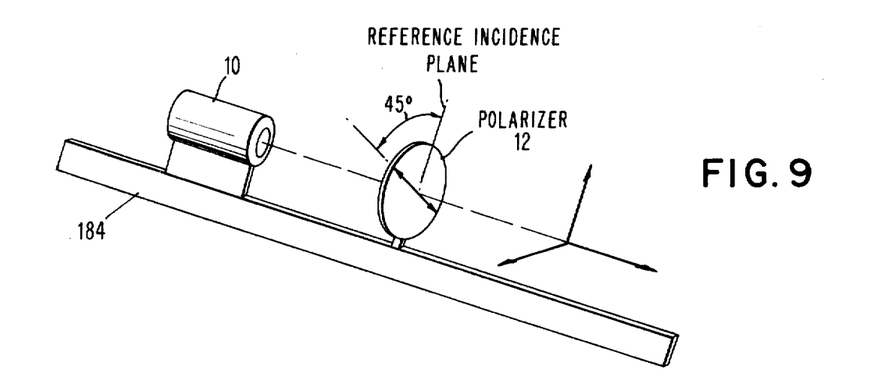
FIG. 9 is a schematic depiction similar to FIG. 1 of the incidence light portion of the ellipsometer illustrating the normal measurement mode of operation.

FIG. 9 schematically illustrates the normal measurement mode of operation. In this FIG., there is shown the incidence light portion of the ellipsometer which includes the collimated monochromatic light source 10 and the polarizing prism 12. The quarter wave plate or compensator is not included. As is shown in FIG. 9, polarizer 12 is set at 45° to the reference incidence plane.

Figure 10:
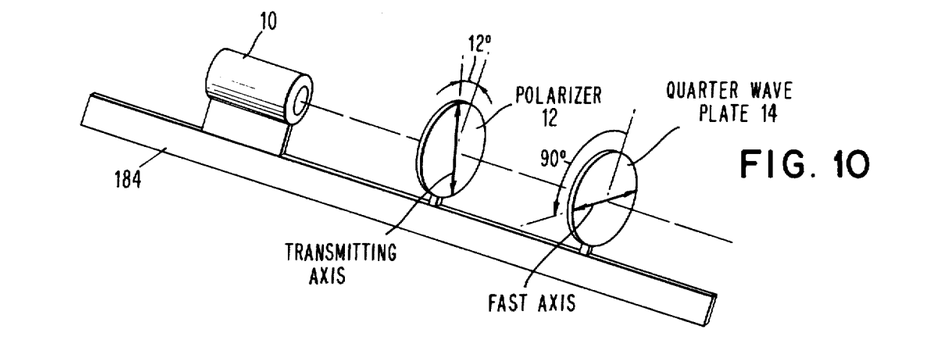
FIG. 10 is a schematic depiction similar to FIG. 9 of the incidence light portion of the ellipsometer illustrating the thin film measurement mode of operation.

Similarly, FIG. 10 schematically illustrates the thin-film mode of operation. In this mode of operation, polarizer 12 is set at 12° relative to the incidence plane and quarter wave plate, i.e., compensator 14 is set at 90° to the incidence plane.

Figure 11:
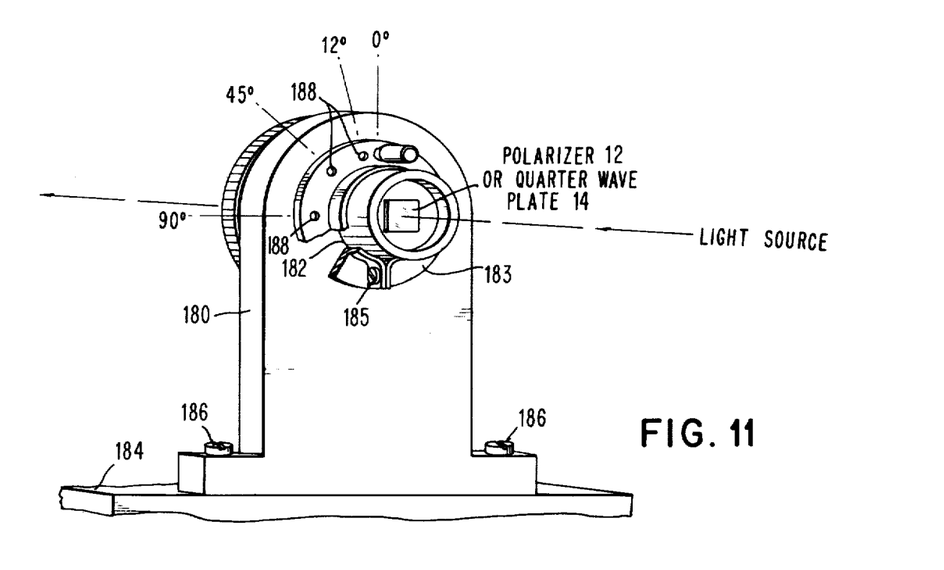
FIG. 11 is a perspective end view of a mount suitable for use with the polarizer and quarter wave plate to effect the modes of operation as depicted in FIGS. 9 and 10.

In FIG. 11, there is shown a mount suitable for use as a means for setting polarizer 12 and quarter wave plate 14 at the desired angles for the normal and thin-film modes of operation. The mount includes a structure 180 including a member 182 having a flange 183, member 182 having a circular opening therethrough which receives either polarizer 12 or quarter wave plate 14. Structure 180 is suitably affixed to base 184 by means of end bolts 186. Polarizer 12 or quarter wave plate 14 is freely rotatable within the opening in member 182.

In structure 180, there are provided openings therethrough generally designated with the numeral 188 at angles 0°, 12°, 45° and 90°. To affix either polarizer 12 or quarter wave plate 14 at a particular one of these angles relative to the reference plane, the polarizer or quarter wave plate is rotated to the desired position and a pin (not shown) is then inserted into the particular opening 188 which obtains to affix the polarizer or quarter wave plate into position.

With regard to the utilization of an ellipsometric technique, a salient step is the manual adjusting of the angle of position of a reflecting sample to align the reflected light with the axis of a fixed detector. One adjustment has to be made to give the correct angle of incidence, and another has to be made to eliminate sample "tilt." These adjustments are critical to the maintaining of measurement accuracy. However, they are tedious and somewhat subjective and therefore may vary from one operator to another.

Figure 4:
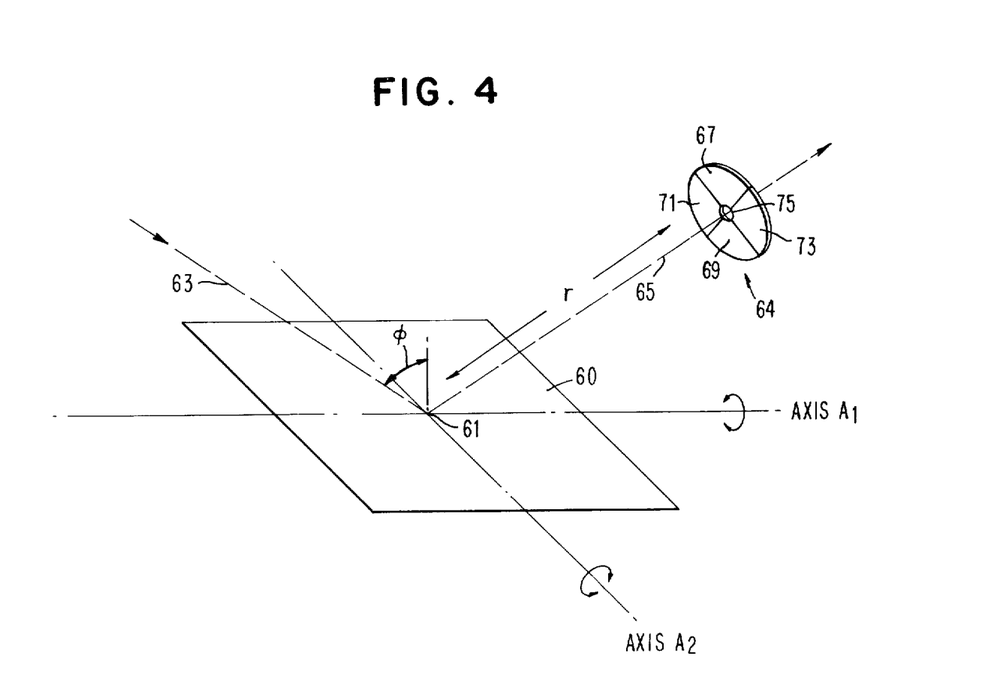
FIG. 4 schematically depicts the sample alignment system of the ellipsometer according to the invention.

Since an ellipsometer is an instrument that permits a beam of light with known polarization properties to fall at a known angle of incidence on a reflecting surface (whose properties are to be determined) and measures the polarization state of the reflected beam of light, the surface properties of the reflecting surface are related to the change in polarization state of the light upon reflection, and may thus be determined by the measurement. It has been shown that both the light source and the detector employed to determine the polarization state of the reflected light have a center line or axis along which the light ideally travels and from which angles of incidence and reflection are measured. Ideally, in order for light to be reflected by the surface and reach the detector, the surface would have to be located at the intersection of the incident and reflecting beams, with the line perpendicular to the surface at their intersection lying in their plane, bisecting the angle between them. The angle of incidence $\phi$ (between the incident light and the perpendicular) thus is ideally fixed, and equal to half the angle between the source and detector axes. This is illustrated in FIG. 4 wherein there is schematically depicted the reflecting surface 60 of the sample whose characteristics are to be measured. This surface rotates on two perpendicular axes, i.e., axis $A_1$ and axis $A_2$, which intersect at a point 61 where the incident light is reflected. Lines 63 and 65 represent the respective axes of incident and reflected light. The angle of incidence is designated by the symbol $\phi$ in FIG. 4.

It has been found that, in practice, however, the incident light may not be parallel to the axis of the light from the source because of imperfect collimation or diffraction due to apertures inserted in the beam. Light that is not on or parallel to the detector axis may be detected because of the necessarily finite detector size and acceptance angle. For the same reason, reflected light may be detected even though the perpendicular to the reflecting surface does not lie in the source-detector axis plane. Where the situation obtains in which the incident light is not parallel to the axis of the source light, the deviation from the ideal exists and thereby there exists a deviation from the assumed value of the incidence angle. Furthermore, as mentioned, reflected light may be detected even though the perpendicular to the reflecting surface does not lie in the source-detector axis plane, such situation being termed sample "tilt," and produces an error in the inferred orientation of the reflected light polarization. With the exception of imperfect collimation or alignment of the incident light, all of the conditions, mentioned above as being encountered in practice, can be prevented from occurring in an otherwise properly aligned ellipsometer by correctly positioning and orienting the reflecting surface.

To align the sample correctly requires that two conditions be met as follows:

1. The sample surface has to be located at the intersection of the source and detector axes.
2. The sample then has to be rotated about that point in each of two directions to obtain the proper angle of incidence and to eliminate sample tilt, i.e., so that reflected light falls on the detector axis.

It is readily apparent that these adjustments when done manually, may occupy a skilled operator for several minutes and two different operators may align the sample differently.

In accordance with the invention, there is therefore, also provided a sample alignment system. This system contains the spot-defining aperture in the incident light beam (aperture 18, FIG. 1), a sample holder capable of being rotated about two perpendicular axes, i.e., axes $A_1$ and $A_2$ as shown in FIG. 4, these axes intersecting at the source and detector axis intersection, i.e., point 61, FIG. 4, and a 4-quadrant beam deviation detector 64, FIG. 4, which is located at a convenient distance from the sample along the detector axis 65, such distance suitably being about 18 inches. The 4-quadrant beam deviation detector 64 suitably comprises a pair of optical fiber bundles 67 and 69 which detect error for rotation about axis $A_2$, such rotation producing a change in the angle of incidence and a pair of optical fiber bundles 71 and 73 for detecting error for rotation about axis $A_1$, rotation about $A_1$ producing a sample "tilt." The 4-quadrant optical fiber bundles 67, 69, 71 and 73 surround an aperture 75 which may suitably have a diameter of about 0.030 inch, the reflected light passing through aperture 75.

Figure 5:
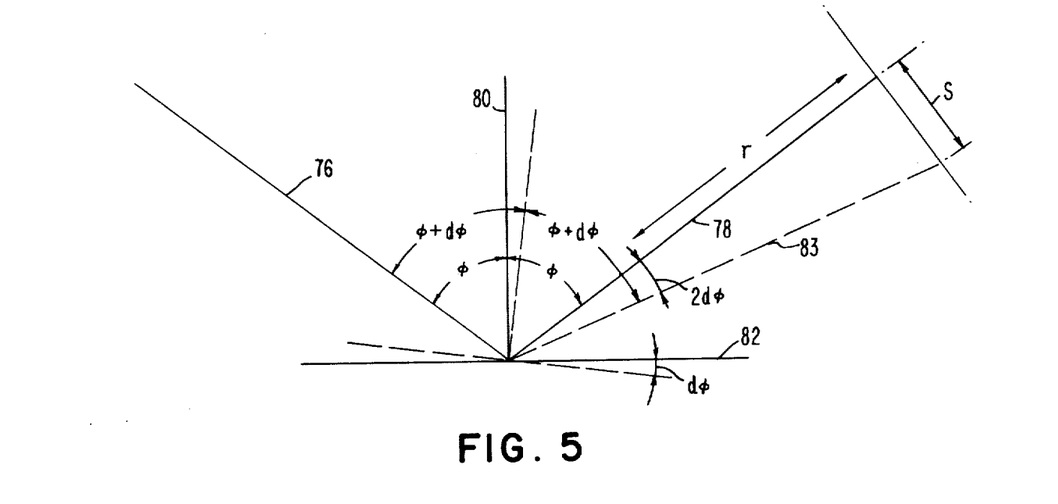
FIG. 5 is a depiction similar to that of FIG. 4 and illustrates one phase of operation of the sample alignment system.

In FIG. 5, there is illustrated the effect of rotation of the reflecting plane about axis $A_2$ to produce a change in angle of incidence. In this FIG., solid line 78 represents incident light and solid line 74 represents reflected light. Solid line 80 is the normal to the reflecting plane. Where the reflecting plane 82 rotates by the amount $d\phi$ about axis $A_2$, then the angle of incidence $\phi$ becomes $\phi + d\phi$, the angle of reflection becomes $\phi + d\phi$ and the deviation of the reflected light beam 78 from its desired path, as shown by dashed line 83, is $2d\phi$. In FIG. 5, $r =$ the distance from the point of reflection and $S =$ the distance the light moves at distance $r = r \tan(2d\phi)$ whereby $S \cong 2r\, d\phi$ wherein $d\phi << 1$. Typical values for the latter formula are: $r = 18$ inches; $d\phi = 0.05° = \pi/3{,}600$ radians; $S = \pi/100$ inches $\cong 0.030$ inch.

Figures 6, 8:
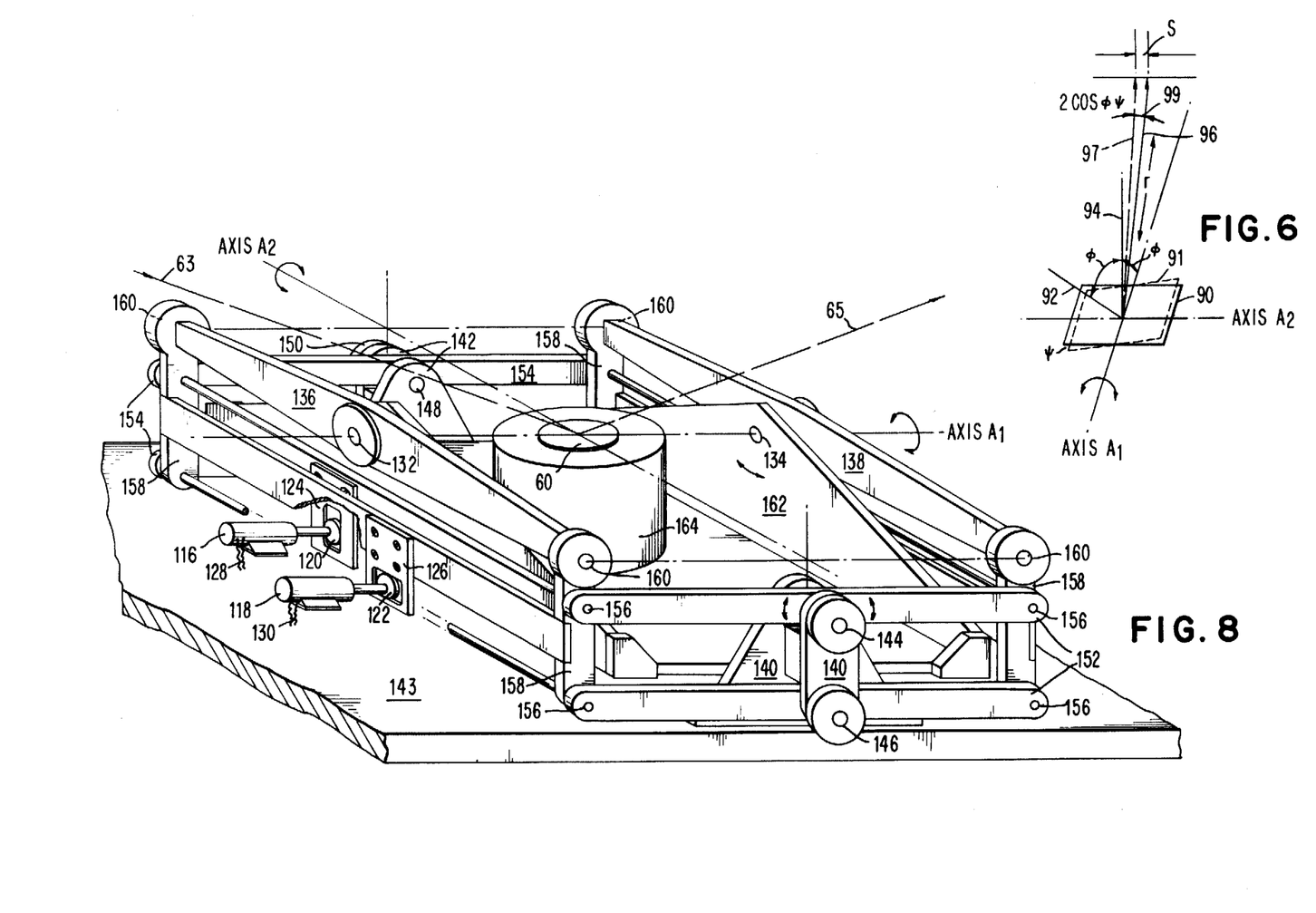
FIG. 6 is a depiction similar to that of FIGS. 4 and 5 and illustrates another phase of operation of the sample alignment system.
FIG. 8 is a three-dimensional drawing of an illustrative embodiment of the sample holder employed in the sample alignment system.

In FIG. 6, there is illustrated the effect of rotation of the reflecting plane about axis $A_1$, i.e., sample "tilt." In this FIG., the reflecting plane 90 is shown rotated about axis $A_1$ by an amount $\psi$ which is the sample tilt angle, the reflecting plane as tilted being depicted by dashed line parallelogram 91. Solid line 92 designates the incident light beam which is fixed and solid line 94 symbolizes the normal to the reflecting surface. Solid line 96 represents the reflected light beam and dashed line 97 represents the reflected light when the reflecting surface, i.e., the surface of the sample, is rotated by an amount $\psi$ about axis $A_1$. The angle represented by the arc bearing the numeral 99 is equal to $2 \cos \phi \psi$. In FIG. 6, $r =$ distance from reflecting surface; $S =$ distance that the light moves at distance $r$ because of a rotation $\psi$ about axis $A_1$ which $= r \cos \phi \cdot \tan(2\psi)$ whereby $S \cong 2r\psi \cos \phi$ wherein $\psi << 1$.

Typical values applied to the situation depicted in FIG. 6 are: $\phi = 70°$, $r = 18$ inches, $S = \pi/100$ inches $\cong 0.030$ inch, $\psi = \pi/100$ Radians/36 $\cos 70° = 0.05°/0.392$ whereby $\psi \cong 0.15°$.

The spot defining aperture (aperture 18, FIG. 1) serves to limit the area of the sample that is measured. If the diameter of this aperture is sufficiently small, such as about 10 mils, for example, a clearly observable, circularly symmetric diffraction pattern is produced, i.e., a bright center surrounded by alternating dark and bright circular areas, which gradually decrease in brightness. The center portion of the light carries the measurement information, and the diffraction fringes are helpful in centering the beam.

As will be further described hereinbelow, the essential component of the sample alignment system according to the invention is a sample holder which provides a pedestal to support the sample and is placed on the ellipsometer so that its two rotation axes, i.e., front to back and left to right, intersect precisely where the source and detector axes intersect. The pedestal is positioned below the point of intersection by a distance which is precisely equal to the height of the sample, thereby properly positioning the sample's top, i.e., reflecting surface. The rotations about the two axes are accomplished by two small dc servomotors using eccentric cams in horizontal and vertical slots, respectively. As will be further illustrated hereinbelow, the support mechanism includes a parallelogram construction which provides a virtual pivot for the front-back rotation axis. This renders the supports lower than the pedestal in front and in back, thereby giving it added accessibility and facilitating the use of automatic sample handling such as, for example, a track, with samples inserted from the front and removed from the rear.

Figure 7:
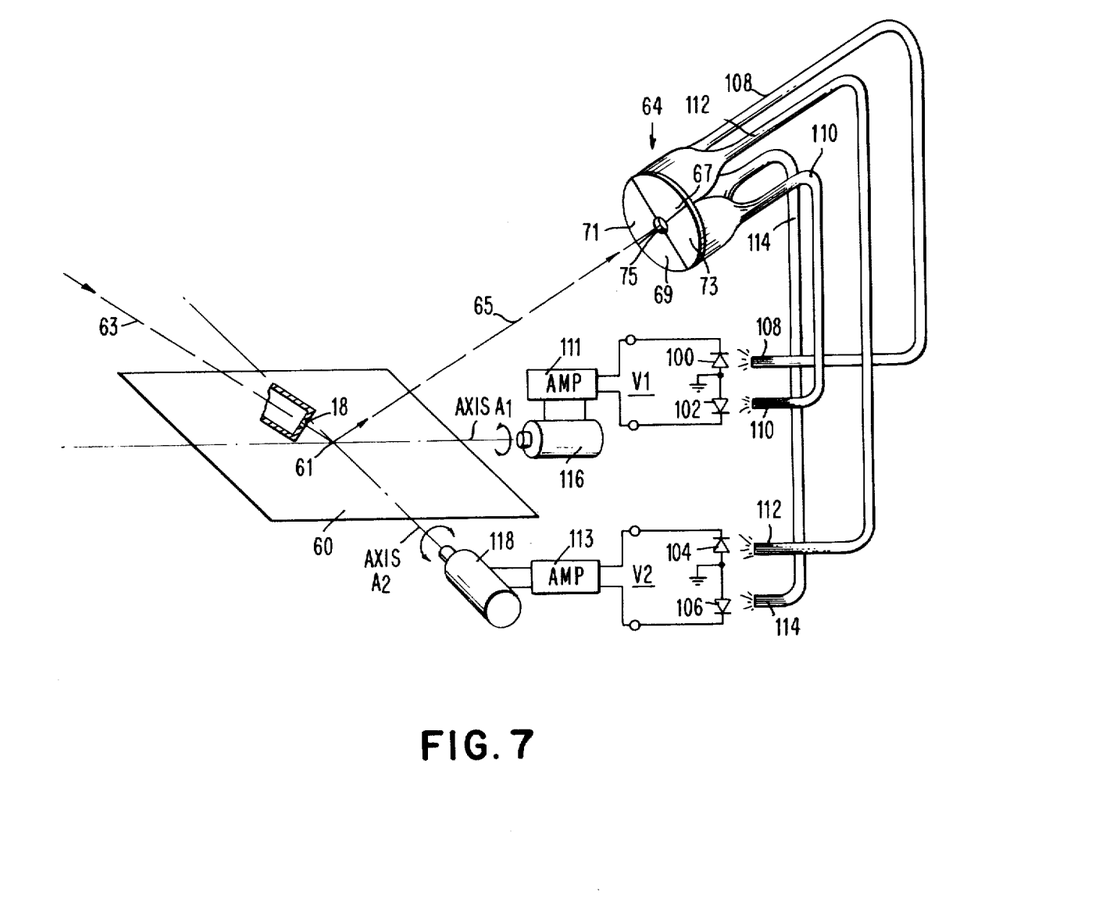
FIG. 7 is a schematic depiction which illustrates the structure and operation of the sample alignment system.

The reflected beam deviation detector is i.e., depicted in FIGS. 5 and 7. As has been set forth in the description of FIG. 5, there is provided the four quadrant detector 64 comprising fiber optic bundles 67, 69, 71 and 73 with a 0.030 inch or other convenient size diameter aperture 75 through which the reflected light passes to the detector. As has been mentioned, the quadrants of the detector 64 are placed pairwise to sense left-right, i.e. sample tilt (fiber optic bundles 71 and 73) and to sense top-bottom, i.e., angle of incidence deviation (fiber optic bundles 67 and 69). Light falling off such an axis onto one or the other of a pair of fiber optic bundles is "piped" to pairs of back-to-back disposed photocells 100 and 102 and 104 and 106 respectively, photocells 100 and 102 receiving the light piped from fiber optic quadrants 71 and 73 through pipes 108 and 110 respectively and photocells 104 and 106 receiving the light from fiber optic quadrants 67 and 69 through pipes 112 and 114 respectively, whereby there are generated two error voltages, viz. $V_1$ and $V_2$, one for each type of deviation error from each of the two pairs of photocells. The sign of the error voltage indicates the sense (direction) of the deviation such as, for example, beam too high or too low. Voltages $V_1$ and $V_2$ are amplified in amplifiers 111 and 113, respectively, and the outputs of amplifiers 111 and 113 are applied to dc servomotors 116 and 118 respectively, to rotate the reflecting surface to its proper plane under the control of these motors. Thereby the reflected light beam 65 is maintained so as to pass through aperture 75.

Reference is now made to FIG. 8 wherein there is shown a suitable embodiment of the sample holder in the sample alignment system.

In the operation of the sample holder depicted in FIG. 8, the voltages designated $V_1$ and $V_2$ (FIG. 7) are applied to the terminals 128 and 130 of motors 116 and 118 respectively. Motor 116, when actuated, rotates a cam 120 which is contained within a vertical slot 124 and motor 118, when actuated, rotates a cam 122 which is contained within a horizontal slot 126. The respective rotations of cams 120 and 122 in slots 124 and 126 cause rotations of the sample 60 about axes $A_1$ and $A_2$ respectively, the point of intersection of axes $A_1$ and $A_2$ on the surface of sample 60 being at the precise location where incident light 63 falls.

Axis $A_1$ is a real axis which is determined by and passes through the bearings 132 and 134 which are respectively mounted on supporting arms 136 and 138. Supporting arms 136 and 138 support bearings 132 and 134 at a height such as to cause axis $A_1$ to pass through the plane of the top surface of sample 60.

Axis $A_2$ is a virtual axis which is at precisely the same height as axis $A_1$ and perpendicular thereto. Axis $A_1$ is produced in the following manner. Two supports, 140 and 142, affixed to the base 143, are each provided with two bearings, 144 and 146, and 148 and 150, which are vertically arranged in pairs. These pairs of bearings support and permit the parallel rotation of two nominally horizontal pairs of arms 152 and 154. Arms 152 and 154 are in turn connected by bearings 156 to, and support the four members 158 such that members 158 revolve in a circular direction around the bearings 144, 146, 148 and 150 while they themselves remain in a strictly vertical orientation. Consequently, the motion of any point on the vertical members 158 describes a circular arc whose center lies on the vertical line connecting the axes of bearings 144, 146, 148 and 150 at the height of the point on member 158 when the nominally horizontal arms 152 are in a true horizontal position.

The bearings 160 are provided on each of the vertical members 158 at the height of the top surface of sample 60. Supporting arms 136 and 138 and their respective bearings 132 and 134 are affixed to bearings 160. In response to the operation of motor 118, bearings 132 and 134, since they are affixed to vertical arms 158 at a height equal to that of the top surface of sample 60, move in circular arcs about axis $A_2$, the latter axis passing through the surface of sample 60 at the point of reflection of incident light 63.

The cradle 162 which supports the sample 60 and its pedestal 164 is thereby rotated about the two perpendicular axes $A_1$ and $A_2$ which intersect at the point of reflection.

As has been mentioned hereinabove, the correct positioning of the sample involves a height constraint and two angular adjustments and is accomplished automatically by the system according to the invention as follows.

The top surface of the sample is suitably placed at the intersection of the source and detector axes in one of two ways.

1. The holder may be made non-adjustable, with the pedestal surface below the desired height by an amount equal to the thickness of the sample to be measured.
2. A manual adjustment may be provided with a suitable height indicator when samples of significantly different thickness are to be measured. Alternatively, the height requirement may be foregone and from knowledge of the sample's thickness, the resulting change, i.e., a different angle of incidence, can be taken into account when the measurement is analyzed. Any combination of these approaches may be chosen according to what is convenient for a given application. The angular adjustments are made by rotating the sample in two directions to center the reflected light on the aperture of the deviation detector. The rotations are accomplished automatically by the two dc servomotors as described hereinabove in conjunction with FIG. 7, driven by the amplified error voltages $V_1$ and $V_2$ produced by the deviation detector. The motors are connected with the appropriate polarity to direct the reflected beam towards the center aperture when it is off center. Due to passage through the circular spot-defining aperture 18, the beam is circularly symmetric. In addition, diffraction effects of this aperture produce a circularly symmetric pattern of light off-axis. Thus, when the center portion of the beam is centered on the aperture of the deviation detector, equal amounts of off-axis light fall on the quadrant fiber bundles. This condition produces zero error voltages and the dc servomotors stop, thereby holding the sample in correct position.

The precision with which a reflecting surface may be aligned is now considered. In this connection, let it be assumed that the top surface of the sample has by some means been positioned to the correct height. Let it be further assumed that the system is only capable of setting the center of the reflected beam somewhere within the deviation detector aperture. Then, the total possible deviation ($d\phi$) in the angle of incidence is $s/2r$ radians, where $s$ is the diameter of the aperture of the fiber optic detector and $r$ is the distance from the point of reflection to the aperture. If $s$, for example, is taken to be equal to 30 mils and $r$ is taken to be equal to 18 inches, then $d\phi$ is 0.05° or ± 0.025°. Further considering the case of tilt, as has been shown in conjunction with FIG. 6, the maximum possible tilt $\psi$ under the same condition is $s/(2r \cos\phi)$ radians, where $\phi$ is the angle of incidence. Using the same values for $r$ and $s$, and 70° for $\phi$, there results 0.15° or ± 0.075° as the maximum sample tilt. It has been found that the center of the beam is positioned very closely to the center of the aperture due to the diffracted light available to the fiber optics when the beam is centered. It is accordingly estimated that the angular deviations are less therefore by a factor of two or three than the worst-case values set forth hereinabove. Thus, for the values of $r = 18$ inches, $s = 0.030$ inch, and $\phi = 70°$, the angle of incidence is correct to ±0.01° and sample tilt is held to within ±0.03° of zero. Correspondingly, smaller tolerances would obtain by increasing the distance $r$ to the deviation detector.

If it is not assumed that the reflecting surface is at the correct height, but only that the height is known, then let it be assumed, for example, that in a level position, the surface is a distance $h$ above the intersection of the source and detector axes. The reflected beam will then be too high when the angle of incidence is at its assumed value of half the angle between the (fixed) source and detector axes. The system will still center the reflected beam, however, the sample will be rotated until the beam passes through the deviation detector aperture. But the angle of incidence will have been changed by an amount $d\phi$ given by $$d\phi = h \sin\phi/r \text{ radians},$$

where $r$ and $h$ are expressed in the same units of length. Thus, when a sample is measured which is too thick or too thin by a known amount, a new angle of incidence may be calculated and used in the analysis. For example, if $r$ is 18 inches, $\phi$ is 70°, and $h$ is about 100 mils, the change $d\phi$ in angle of incidence is 0.30°. Within the limits set by the acceptance angle of the detector, the angle of incidence may be intentionally varied in this way. For example, there may be provided a set of gauge blocks to place under the sample to accomplish this change.

It has been found that typical times to bring the reflected light to a centered position utilizing the alignment system according to the invention are less than one second. The system may be advantageously employed for use with fairly intense light sources as the 1 mw He Ne laser or with less intense sources with higher amplification and light shielding.

While the invention has been particularly shown and described with reference to the preferred embodiment thereof, it will be understood by those skilled in the art that the foregoing and other changes in form and details may be made therein without departing from the spirit and scope of the invention.

What is claimed is:

1. An automatic ellipsometer for measuring characteristics of a sample disposed in a chosen incidence plane comprising:
    a monochromatic light source for providing an incident light beam on said sample to cause a light beam to be reflected therefrom;
    a first polarizing element in the path of said incident light beam, said first polarizing element being adapted to be fixed at a predetermined angle relative to said incidence plane;
    adjusting means for setting the azimuth of said first polarizing element at different discrete predetermined angles relative to said incidence plane,
    a second and rotating polarizing element in the path of said reflected light beam;
    a photoresponsive device in the path of said reflected light beam responsive to said beam after it has passed through said second polarizing element, said photo-responsive device producing an electrical output in response to said reflected light beam's impinging thereon;
    an angular encoder associated with said second polarizing element for providing first pulses for each revolution of said rotating second polarizing element and respective second pulses for each chosen fraction of each of said revolutions;
    an analog-to-digital converter responsive to the outputs of said angular encoder and said photoresponsive device for digitizing the output of said photoresponsive device in accordance with said second pulses; and
    data analyzing means responsive to the application thereto of the output of said analog-to-digital converter and said first pulses for analyzing the output of said photoresponsive device.

2. An automatic ellipsometer as defined in claim 1 wherein said predetermined angles are 0°, 12°, 45° and 90°.

3. An automatic ellipsometer as defined in claim 2 wherein said predetermined angle is 45° to place said ellipsometer in the normal mode of operation.

4. An automatic ellipsometer as defined in claim 1 and further including a quarter wave plate disposed in the path of said incident light beam intermediate said first polarizing element and said sample, and
    setting said first polarizing element at different discrete first predetermined angles relative to said incidence plane and second adjusting means for setting said quarter wave plate at different discrete second predetermined angles relative to said incidence plane.

5. An automatic ellipsometer as defined in claim 4 wherein said predetermined angles are 0°, 12°, 45° and 90°.

6. An automatic ellipsometer as defined in claim 5 wherein said first predetermined angle is 12° and said second predetermined angle is 90°.

7. An automatic ellipsometer as defined in claim 1 and further including a spot defining aperture means for said light beam which is disposed intermediate said first polarizing element and said sample, said aperture means having an axis of transmission which is colinear with incident light beam.

8. An automatic ellipsometer as defined in claim 7 wherein said monochromatic light source is a collimated laser source.

9. An automatic ellipsometer as defined in claim 8 wherein said laser is a HeNe laser.

10. An automatic ellipsometer as defined in claim 8 wherein said photoresponsive device is a photomultiplier tube.

11. An automatic ellipsometer as defined in claim 10 wherein said second and rotating polarizing element is driven by a rotating shaft; and wherein said angular encoder is mounted on said shaft.

12. An automatic ellipsometer as defined in claim 8 wherein the quantity of said second pulses produced for each of said revolutions is $2^n$ wherein $n$ is equal to 7 to 10.

13. An automatic ellipsometer as defined in claim 1 and further including:
    automatic sample alignment means comprising:
    sample holding means,
    means for rotating said sample holding means about two horizontal perpendicular axes which intersect at the point of intersection of said incident and reflected light beams, and
    reflected light beam deviation detection means disposed in the path of said reflected light beam.

14. An automatic ellipsometer as defined in claim 13 wherein said reflected light beam deviation detection means is disposed in the path of said reflected light beam intermediate said second polarizing element and said photoresponsive device.

15. An automatic ellipsometer as defined in claim 14 wherein one of said horizontal axes is a left-to-right rotational axis and the other of said horizontal axes is a front-to-rear rotational axis;

said means for rotating said sample holding means further including first motor means for rotating said sample holding means about said one of said horizontal axes and second motor means for rotating said sample holding means about said other of said horizontal axes.

16. An automatic ellipsometer as defined in claim 15 wherein said reflected light beam deviation detection means comprises:

four optical fiber bundles arranged in quadrature and defining a central aperture disposed in the proper path of said reflected light beam, a first pair of diametrically disposed ones of said optical fiber bundles being operative to detect lateral deviation of said reflected light beam from said proper path, and a second pair of the other diametrically disposed optical fiber bundles being operative to detect angular incidence deviations of said reflected light beam from its proper path;

first, second, third and fourth photoresponsive means;

first, second, third and fourth light pipe means associated with each of said optical fiber bundles respectively, for transmitting light from each of said bundles to impinge on said first, second, third and fourth photoresponsive means respectively, the impinging of light on said photoresponsive means causing the production of electrical outputs therefrom;

means for applying the electrical outputs produced from the pair of said photoresponsive means in response to impinging light from said first pair of optical fiber bundles to said first motor means to cause the rotation of said sample holding means on said left-to-right axis for an angular distance sufficient to result in a zero output from said last-named photoresponsive means; and means for applying the electrical outputs produced from the pair of said photoresponsive means in response to impinging light from said second pair of optical fiber bundles, to said second motor means to cause said sample holding means to be rotated along said front-to-rear axis for an angular distance sufficient to result in a zero output from said last-named photoresponsive means;

whereby upon the obtaining of a state wherein there is no output from said photoresponsive means, said reflected light beam is disposed in said proper path to pass through said defined aperture.

17. An automatic ellipsometer as defined in claim 16 wherein the photoresponsive means associated with each of said pairs of optical fiber bundles respectively comprise a pair of oppositedly poled photoelectric cells, said pairs of photoelectric cells producing error voltages in response to deviations of said reflected light beam from said proper path, the signs of said error voltages representing the senses of said deviations.

18. An automatic ellipsometer as defined in claim 15 wherein said sample holding means comprises:

means for supporting said sample substantially at a plane which contains said point of intersection of the proper axes of said incident and reflected light beam;

means associated with said supporting means, said associated means containing a first and vertical slot, and a second and a horizontal slot;

first and second cams disposed in said first and second slots respectively;

means for coupling said first motor to said first cam; and means for coupling said second motor to said second cam;

whereby upon the actuation of said first motor means, said first cam is caused to be rotated and to move vertically in said first slot to thereby cause said sample holding means to be rotated about said front-to-rear rotational axis and whereby upon the actuation of said second motor means, said second cam is caused to be rotated to move horizontally in said second slot to thereby cause said sample holding means to be rotated about said left-to-right rotational axis.

19. An automatic ellipsometer as defined in claim 18 and further including:

means associated with said supporting means for defining said left-to-right rotational axis as one which passes through the plane of the surface of said sample; and second means associated with said support for defining said front-to-rear rotational axis as one which is at the same height as said left-to-right rotational axis, and perpendicular thereto.

20. An automatic ellipsometer as defined in claim 19 and further including:

means associated with said supporting means for preventing mechanical interference along said front-to-rear rotational axis.

* * * * *